United States Patent [19]

Hyde

[11] Patent Number: 4,824,583

[45] Date of Patent: Apr. 25, 1989

[54] LUBRICATING COMPOSITIONS FOR PVC OR THE LIKE

[75] Inventor: Jeffrey R. Hyde, West Chester, Ohio

[73] Assignee: Morton Thiokol, Inc., Chicago, Ill.

[21] Appl. No.: 185,607

[22] Filed: Apr. 25, 1988

[51] Int. Cl.$^4$ .......................................... C10M 107/18
[52] U.S. Cl. ................................... 252/39; 252/52 A
[58] Field of Search ................ 524/109; 252/39, 52 A

[56] References Cited

U.S. PATENT DOCUMENTS

| | | | |
|---|---|---|---|
| 3,314,886 | 4/1967 | Morway | 252/39 X |
| 3,640,828 | 2/1972 | Brotz | 252/39 X |
| 4,661,544 | 4/1987 | Quinn | 524/109 |

Primary Examiner—William R. Dixon, Jr.
Assistant Examiner—James M. Hunter, Jr.
Attorney, Agent, or Firm—Wayne E. Nacker; Gerald K. White

[57] ABSTRACT

A lubricating composition for PVC or the like is provided by partially saponifying a triglyceride material, such as an animal tallow, with calcium hydroxide in the presence of at least about 10% water. The minor amount of oxidized polyethylene admixed with the saponified material maintains the resulting soap and esters in a homogeneous lubricating compositions. The lubricating compositions are particularly suitable for preparing rigid resin compositions.

16 Claims, No Drawings

LUBRICATING COMPOSITIONS FOR PVC OR THE LIKE

The present invention is directed to lubricating compositions of PVC and related halogen-containing polymers, to preparation of such lubricating compositions and to the use of such lubricating compositions to lubricate, during fusion, rigid PVC compounds and related rigid halogen-containing polymer compounds.

BACKGROUND OF THE INVENTION

Solid polyvinyl chloride (PVC) compositions are typically formed by fusing, e.g., in an extruder or high speed mixer, a mixture or compound of PVC resin and other components, such as pigments, lubricants, U.V. stabilizers, etc., and forming the fused material. Generally, the formation of a solid PVC composition requires a heat stabilizer during fusion of the PVC compound to prevent precipitous loss of hydrogen chloride from the PVC resin which would result in conjugated double bonds, discoloration and weakening of the solid composition. A preferred class of stabilizers is organotin stabilizers, particularly organotin mercaptides, such as described in U.S. Pat. No. 4,558,083, the teachings of which are incorporated herein by reference. In addition to a heat stabilizer, it is conventional to use a lubricant or combination of lubricants, such as paraffin wax, salts of stearic acid or other fatty acids, esters of fatty acids and oxidized polyethylene to reduce melt viscosities and improve other rheological properties of the compound during fusion. One commercial lubricant composition, for example, comprises a mixture of paraffin wax, calcium stearate and oxidized polyethylene. This commercial composition is used in conjunction with organotin stabilizers to form solid PVC compositions.

In formulating lubricant compositions for PVC or the like, considerable effort is expended in selecting various salts of fatty acids and various esters of fatty acids. Selected mixtures are blended together in an attempt to provide a homogeneous lubricant composition suitable for adding to the PVC resin. Typically, there is some difficulty in producing a homogeneous lubricant mixture, particularly if a combination of fatty acids, esters of fatty acids and salts of fatty acids are used, due to a basic incompatibility of salts of fatty acids with esters of fatty acids. In mixtures of salts of fatty acids and esters of fatty acids, there is a tendency for the salts (soaps) to separate into curds.

There exists a need to simplify the process for providing lubricant compositions suitable for forming PVC resin compositions or the like and to provide less expensive lubricant compositions.

SUMMARY OF THE INVENTION

In accordance with the present invention, a lubricant composition for lubricating solid PVC resin compounds or the like is prepared by saponifying a triglyceride material, such as an animal tallow or a vegetable oil, with hydrated lime (calcium hydroxide ($Ca(OH)_2$)) in the presence of water and admixing the same with oxidized polyethylene: Preferably, the oxidized polyethylene is present during the saponification. The process provides a homogeneous lubricant composition which is substantially less expensive than lubricant compositions prepared by blending selected salts and esters of fatty acids. Furthermore, the process of preparing the lubricant composition is simple to perform and eliminates problems with respect to achieving a homogeneous lubricant composition.

DETAILED DESCRIPTION OF CERTAIN PREFERRED EMBODIMENTS

In preparing lubricant compositions in accordance with the present invention, substantially any naturally-occurring triglyceride material is suitable. Such triglyceride materials include animal tallows obtained, for example, from cattle, horses, pigs and sheep. Also included are vegetable oils such as coconut oil, palm oil, soybean oil, corn oil, cottonseed, groundnut, sunflower, rape, safflower, palm kernel, linseed, and castor. Mixtures of fats and oils are also suitable. In all cases, the saponified lubricant composition, produced in accordance with the present invention, will be a complex mixture of calcium salts of fatty acids (calcium soaps), mono, di and tri glycerides and free glycerol along with the added oxidized polyethylene. It is suprisingly found that such a mixture of components works as well in forming solid PVC compositions as do lubricant compositions prepared by blending selected soaps and selected esters.

An important, though not necessarily overriding, consideration for selection of the triglyceride material is cost. A particular triglyceride, e.g., fat or oil, however, may be selected as most suitable for a particular application.

The amount of calcium hydroxide added to the fat or oil depends upon the degree of saponification required. Typically, sufficient calcium hydroxide is added at an amount equivalent to about two thirds of the fatty acid present, although an amount equivalent to from about one half to about all of the fatty acid content of the triglyceride composition may be used. (One divalent calcium ion is the equivalent of two fatty acid moieties). On a weight percent basis, calcium hydroxide generally comprises between about 10 and about 85% of the saponification mixture (triglyceride material plus calcium hydroxide).

A lubricant composition of this invention also includes oxidized polyethylene which is found to be necessary to maintain the soaps and esters as a homogeneous composition. Oxidized polyethylene used in accordance with the present invention preferably has an acid number in the range of about 15; however, oxidized polyethylenes with acid numbers ranging from about 2 to about 50 are suitable.

The weight ratio of the saponification mixtures (triglyceride material plus calcium hydroxide) to oxidized polyethylene is between about 95:5 and about 50:50, 90:10 being typical.

The oxidized polyethylene is preferably admixed with the calcium hydroxide and triglyceride material prior to the saponification reaction. A practical reason for adding the oxidized polyethylene prior to saponification is that it eliminates a subsequent mixing and blending step. Also, with oxidized polyethylene present from the start, the soap (fatty acid salts) does not separate from the ester components. If polyethylene is not present, curds of soap are formed which must be subsequently emulsified by admixture of oxidized polyethylene. Furthermore, if oxidized polyethylene is initially present, functional groups of the oxidized polyethylene, particularly carboxyl groups, react with the components of the saponification mixture, e.g., by esterification, and such reactions are believed to promote homogeneity of the lubricant composition.

It is found that water is required to catalyze the saponification of the triglyceride composition. At least about 10% water relative to triglyceride material is required. Although there is no upper limit to the level of water, excess water must be removed after saponification; thus, about 10% water content (relative to triglyceride) is considered to be generally optimal.

In accordance with a preferred aspect of the present invention, the triglyceride material, the calcium hydroxide, the oxidized polyethylene and the water are charged together into a reaction vessel. The materials are heated for such time and temperature until reaction of the calcium hydroxide with the triglyceride is substantially complete. The time required varies according to the temperature of saponification. Generally the saponification temperature is at least about 100° C. A typical saponification is conducted at 105° C. for two hours. The saponification reaction mixture may also contain other ingredients, such as other organic lubricants. During saponification, measures are preferably taken to minimize or eliminate foaming, e.g., through the use of a sufficiently large reaction vessel.

After the saponification is completed, i.e., after at least about 90% of the calcium hydroxide has been consumed, excess water is removed, e.g., by evaporation using a nitrogen sweep. Next the lubricant composition is cooled and then changed to a physical form suitable for lubricating a PVC resin composition, e.g., flakes.

The lubricant compositions are used as lubricants to prepare rigid PVC compositions or the like in a conventional manner. The lubricant compositions may be used alone or in conjunction with other lubricants, such as paraffin wax. Generally, lubricant composition in accordance with the invention is used at between about 0.5 and about 3.0 parts per 100 parts of resin. Total lubricants, e.g., lubricant composition according to the present invention plus paraffin wax, generally is used at between about 0.5 and about 3.0 parts per 100 parts of resin.

The PVC composition is generally formulated using a heat and light stabilizer, particularly an organotin stabilizer. Preferred organotin stabilizers are organotin mercaptides, such as are described in above-referenced U.S. Pat. No. 4,558,083. Most preferably, organotin stabilizers have the general formula for example,

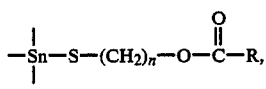

for example,

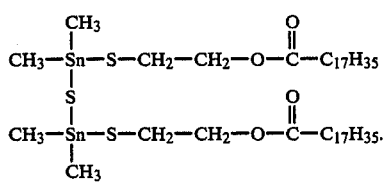

The stabilizer generally is used at between about 0.2 and about 2.5 parts per 100 parts of resin.

The PVC composition may contain other components as are known in the art, such as calcium carbonate filler. Colorants, such as titanium dioxide, may be added. Materials which enhance stability with respect to weathering and light may also be added.

A PVC resin compound is formed by mixing the PVC resin, the lubricant and the heat and light stabilizer, and the compound is subjected to high mechanical shear forces and elevated temperatures such that the compound fuses. The fused compound is formed, e.g., by extrusion or molding. The fused material forms a rigid composition upon cooling. The lubricant composition helps to reduce friction during and subsequent to fusion, and thereby helps to stabilize the compound.

The term "PVC" as used herein is intended to include not only vinyl chloride homopolymers, but copolymers wherein the major component is vinyl chloride, and comonomers include one or more ethylenically unsaturated compounds, such as vinylidene chloride, vinyl acetate and esters of ethylenically unsaturated carboxylic acids, such as acrylic acid and methacrylic acid. The term "PVC" as used herein is further intended to be inclusive of chlorinated PVC (CPVC) and chlorinated PVC copolymers.

The invention will now be described in greater detail by way of specific examples.

EXAMPLE 1

A lubricant composition was formulated as follows:

| Material | Parts |
| --- | --- |
| Beef Tallow | 12.5 |
| Calcium hydroxide | 1.1 |
| Water | 1.0 |
| Oxidized polyethylene (AC-629a) | 1.0 |

The materials were all charged into a reaction vessel and heated at 105° C. for 2 hours. The lubricant composition thus formed was swept with nitrogen to drive off residual water. Then the lubricant composition was cooled and flaked.

EXAMPLE 2

Composition A, a standard injection molding formulation, and Composition B, using the lubricant according to the invention were formulated as follows:

| Material | Composition A | Composition B |
| --- | --- | --- |
| PVC (Geon ® 110 × 334) | 100.0 | 100.0 |
| Calcium carbonate filler (Omya ® FT) | 3.0 | 3.0 |
| TiO$_2$ | 1.0 | 1.0 |
| Acrylic processing aid (K12ON) | 1.5 | 1.5 |
| Acrylic impact modifier (KM 611) | 3.0 | 3.0 |
| Advastab ® TM 181 a thioglycolate-based tin stabilizer | 2.0 | 2.0 |
| Loxiol ® G-30, an ester wax from Henkel | 1.0 | — |
| Loxiol ® G-70 an ester wax from Henkel | 0.25 | — |
| Calcium stearate | 0.75 | — |
| lubricant comp (Ex. 1) | — | 2.0 |

The resin formulations were blended at 190° C. and 100 RPM in a Henschel high intensity mixer (model 2JSS). Specimens were withdrawn at various mixing times and tiles were formed from the withdrawn specimens. Hunter colorimeter values and whiteness indices of the tiles formed from different specimens are given below:

| | Hunter Colorimeter Values | | | | | |
|---|---|---|---|---|---|---|
| | | | min | | | |
| Comp | 2 | 4 | 5 | 8 | 10 | 12 |
| A | 11.05 | 13.69 | 16.77 | 19.79 | 22.79 | 28.38 |
| B | 9.74 | 11.86 | 13.92 | 16.16 | 20.26 | 30.01 |
| | | | Whiteness | | | |
| A | 38.06 | 30.40 | 23.50 | 14.53 | 3.08 | −13.41 |
| B | 41.48 | 32.56 | 22.20 | 11.61 | −3.41 | −26.04 |

The results show that the lubricant composition prepared in accordance with the present invention performs comparably to a standard, more difficult to prepare and more expensive lubricant formulation.

While the invention has been described in terms of certain preferred embodiments, modifications obvious to one with ordinary skill in the art may be made without departing from the scope of the present invention.

Various features of the invention are set forth in the following claims.

What is claimed:

1. A process of preparing a lubricant useful for preparing a rigid poly(vinyl chloride) composition or the like, the method comprising mixing (1) a triglyceride material, (2) calcium hydroxide equivalent to between about 50% and 100% of the fatty acid content of said triglyceride material, (3) water at a level of at least about 10 wt. % relative to the total weight of said triglyceride material plus calcium hydroxide and (4) oxidized polyethylene having an acid number of between about 2 and about 50 at a level that achieves a weight ratio of (A) triglyceride material plus calcium hydroxide to (B) oxidized polyethylene of between about 95:5 and about 50:50; and heating said mixture to substantially react all of said calcium hydroxide with said triglyceride material, thereby producing a homogeneous lubricant composition.

2. A process according to claim 1 wherein calcium hydroxide is provided at an amount equivalent to about ⅔ of said fatty acid content.

3. A process according to claim 1 wherein said oxidized polyethylene has an acid number of about 15.

4. The product of the process of claim 1.

5. A process according to claim 1 further comprising removing residual water from said lubricant composition after reacting said triglyceride material with said calcium hydroxide.

6. A process according to claim 5 further comprising flaking said lubricant composition.

7. The product of the process of claim 5.

8. The product of the process of claim 6.

9. A process of preparing a lubricant useful for preparing a rigid poly(vinyl chloride) composition or the like, the method comprising:
mixing (1) a triglyceride material, (2) calcium hydroxide equivalent to between about 50% to 100% of the fatty acid content of said triglyceride material, and (3) water at a level of at least about 10 wt. % relative to the total weight of said triglyceride material plus calcium hydroxide;
heating said mixture of triglyceride material, calcium hydroxide and water to substantially react all of said calcium hydroxide with said triglyceride material to produce a reacted mixture, and
admixing, with said reacted mixture, oxidized polyethylene having an acid number of between about 2 and about 50 to achieve a weight ratio of (A) initial triglyceride material plus initial calcium hydroxide to (B) oxidized polyethylene of between about 95:5 and about 50:50, to emulsify said reaction mixture, thereby producing a homogenous lubricant composition.

10. A process according to claim 9 wherein calcium hydroxide is provided at an amount equivalent to about ⅔ of said fatty acid content.

11. A process according to claim 9 wherein said oxidized polyethylene has an acid number of about 15.

12. The product of the process of claim 9.

13. A process according to claim 9 further comprising removing residual water from said lubricant composition after reacting said triglyceride material with said calcium hydroxide.

14. A process according to claim 13 further comprising flaking said homogeneous lubricant composition.

15. The product of the process of claim 13.

16. The product of the process of claim 14.

* * * * *